April 21, 1931.   A. G. S. SHERMAN   1,801,645
CAMPING TRAILER
Filed Feb. 17, 1930   3 Sheets-Sheet 1

INVENTOR
Arthur G. S. Sherman
BY
J. S. Murray
ATTORNEY

April 21, 1931.   A. G. S. SHERMAN   1,801,645
CAMPING TRAILER
Filed Feb. 17, 1930   3 Sheets-Sheet 2
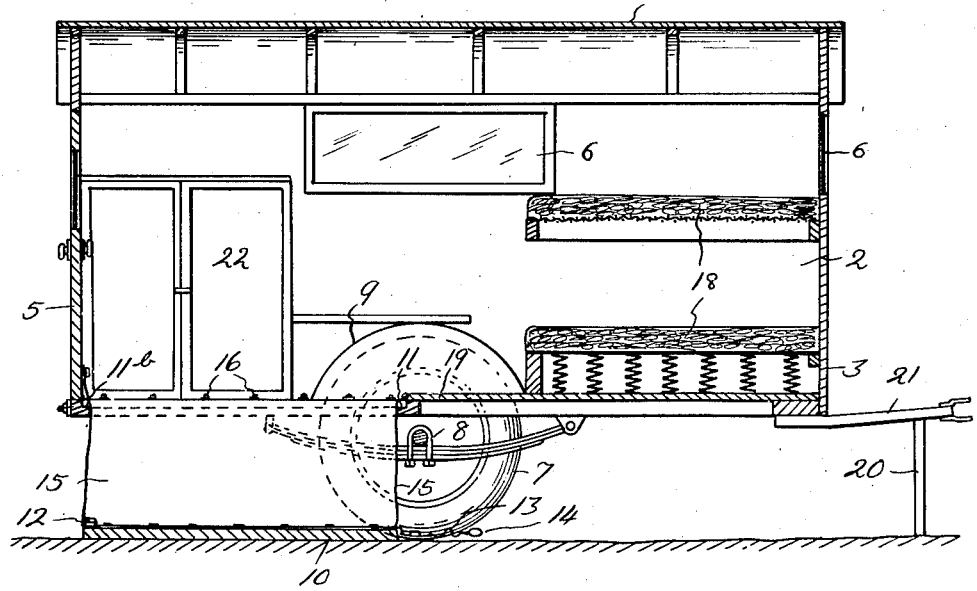
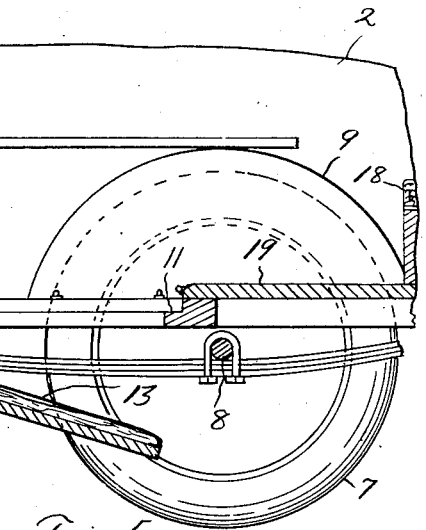
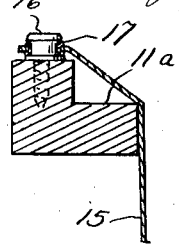
INVENTOR
Arthur G. S. Sherman
BY
J. S. Murray
ATTORNEY April 21, 1931.  A. G. S. SHERMAN  1,801,645
CAMPING TRAILER
Filed Feb. 17, 1930   3 Sheets-Sheet 3
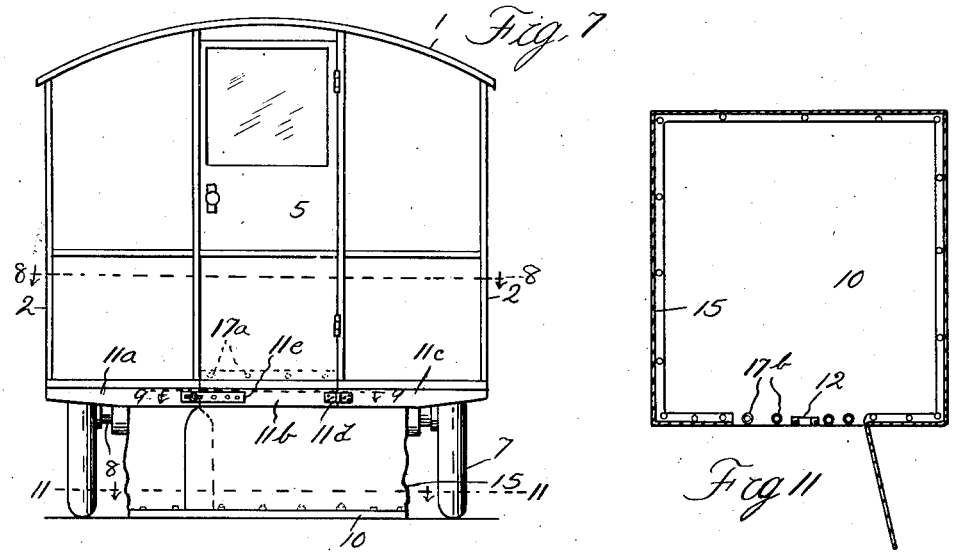
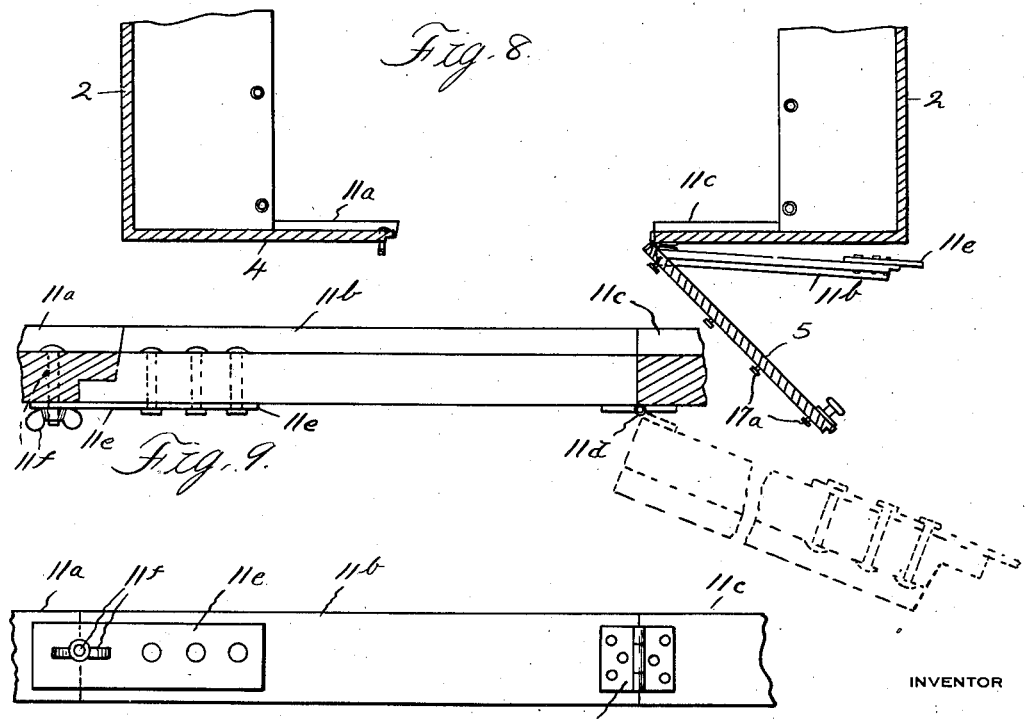
INVENTOR
Arthur G. S. Sherman
BY
ATTORNEY Patented Apr. 21, 1931

1,801,645

UNITED STATES PATENT OFFICE

ARTHUR G. S. SHERMAN, OF DETROIT, MICHIGAN

CAMPING TRAILER

Application filed February 17, 1930. Serial No. 429,094.

This invention relates to trailers for road vehicles, and particularly to camping trailers.

It is desirable in such trailers to permit occupants thereof to stand upright when the trailer is encamped, but it is undesirable to give the trailer vertical or lateral dimensions exceeding those common to automobiles, as this would give rise to undue wind resistance on the road. A minimum height also is desirable as tending toward a maximum stability of equilibrium.

An object of the invention is to afford adequate head room in the body of a camping trailer, without undue resulting height, by forming the bottom of said body with an opening closed when the trailer is on the road by a suitable platform, adapted to be let down upon the ground beneath said opening in camp.

Another object is to connect the margins of such a platform and opening by suitable walls, which may be of canvas or like flexible material, so as to exclude wind, rain, and dust from said opening, when the platform is lowered.

A further object is to form a trailer body with a doorway at one end thereof, and arrange in its other end portion one or more berths compactly disposed with their length transverse to said body.

Still another object is to mount a trailer body of the described character on a single wheeled axle engaging substantially centrally beneath the body, said berths being provided forwardly of said axle, and said platform and opening occupying the maximum space available forwardly of the axle, a member being provided above the axle between said berths and opening to serve as a seat or bench when the platform is lowered, and coacting with the latter in its raised position to form a floor.

A still further object is to adapt such a platform to be readily shifted between its raised and lowered positions by a person standing exteriorly adjacent to the doorway thereof.

These and various other objects the invention attains by the construction hereinafter described and illustrated in the accompanying drawings, wherein:

Fig. 4 is a longitudinal, vertical sectional view, showing the platform in lowered position.

Fig. 5 is a fragmentary, longitudinal vertical section, showing the tilted position assumed by the platform in raising or lowering the same through the bottom opening in the trailer body.

Fig. 6 is a fragmentary enlargement of a portion of Fig. 5, showing one of the fasteners attaching the canvas wall member to the trailer body.

Fig. 7 is a rear view of the trailer as arranged for use in camp, or as shown in Fig. 4.

Fig. 8 is a fragmentary, horizontal sectional view taken upon the line 8—8 of Fig. 7, but showing the trailer door open and an adjustable portion of a cross bar adjacent to the rear trailer wall swung from its normal position to afford a clear passage below the doorway.

Fig. 9 is a fragmentary horizontal section taken upon the line 9—9 of Fig. 7, more fully showing said adjustable portion of the rear cross bar.

Fig. 10 is a rear view of the same.

Fig. 11 is a horizontal section taken on the line 11—11 of Fig. 7, and showing how a canvas enclosure which connects the lowered platform to the vehicle may be in part swung to the rear to extend the doorway to the ground.

Figure 1:
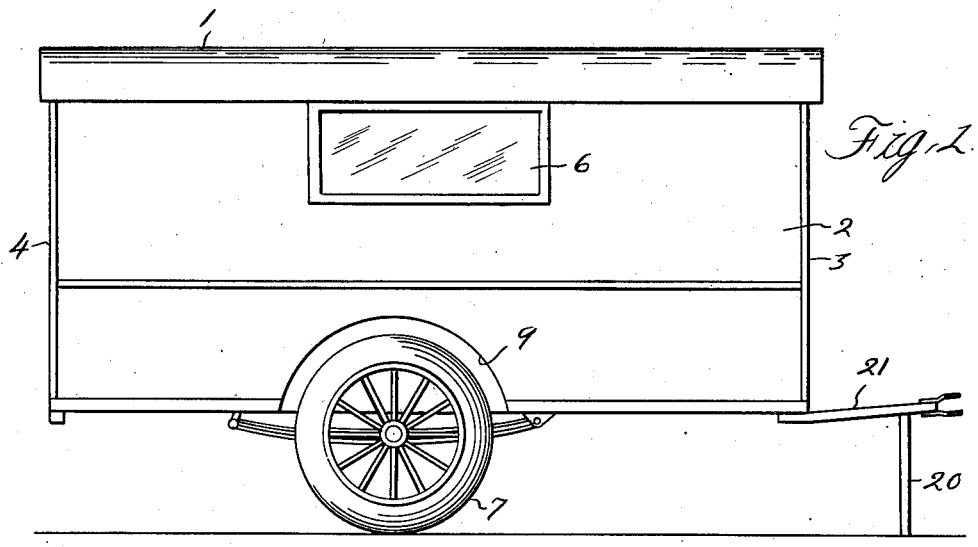
Fig. 1 is a view of the improved trailer in side elevation, shown ready for the road.

In these views, the reference character 1 designates the roof, preferably arched slightly between its lateral margins, 2 the side walls, and 3 and 4 the front and back wall of a trailer body. Said parts may be formed of any suitable sheet material, wall board being preferred because of its lightness and low heat conductivity. A door 5 gives access to said body through its front or rear wall, preferably the latter, and the other end wall and the sides may be formed with suitable windows 6.

The described body is elevated upon a pair of wheels 7 journaled on an axle 8 secured to the bottom of said body approximately midway of its ends, and overhangs said wheels, being formed with interiorly projecting housings 9 conforming to and enclosing the wheel top portions.

Figures 2, 3:
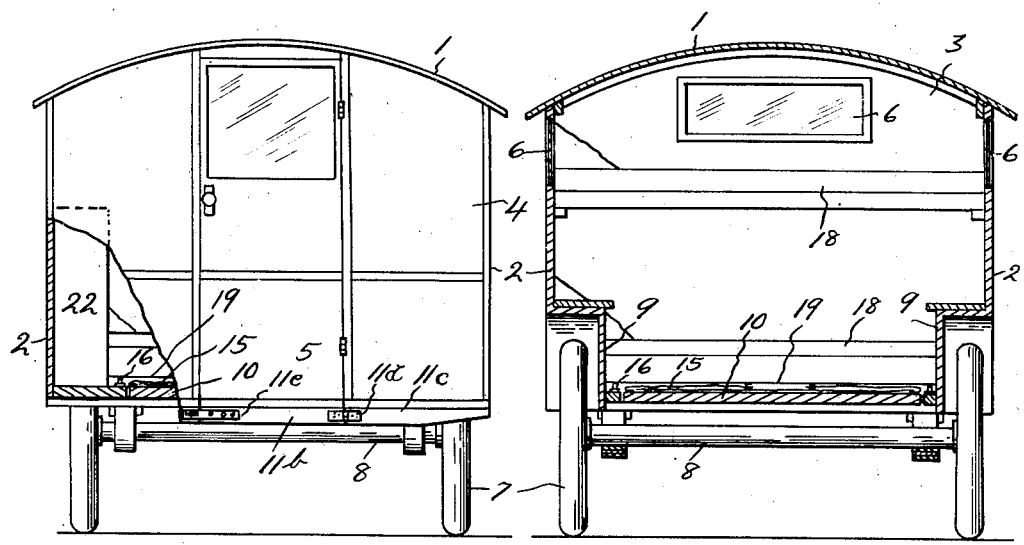
Fig. 2 is a rear view of the same.
Fig. 3 is a cross sectional view, taken upon the line 3—3 of Fig. 1.

The trailer body is formed with a bottom opening extending substantially from the axle to the rear wall and having a width preferably determined by the distance between the housings 9, and a platform 10 is adapted to close said opening, as best appears in Fig. 3, when the trailer is on the road. In camp, said platform may be lowered, as in Figs. 4 and 7, resting on the ground (or other supporting surface) beneath said opening, materially increasing head room. A cross bar 11 is extended completely across the vehicle at the forward edge of said opening and a cross bar comprising sections 11a, 11b and 11c is similarly extended across the vehicle adjacent to its rear wall, both of said cross bars being preferably rabbeted to adapt the platform to seat flush with their top faces. The cross bar sections 11a and 11c rigidly and permanently engage the vehicle body, while the section 11b, which normally underlies the doorway, has one end hinged coaxially with the door as indicated at 11d. The other end of the section 11c is rabbeted to engage a corresponding rabbet in the section 11a and rigidly carries a metal strap 11e which may be suitably detachably connected to the section 11a as by a bolt and nut 11f. Thus said section 11b may be swung clear of the doorway when the trailer is in camp, while the three sections 11a, 11b and 11c form a rigid cross bar and brace when the trailer is on the road.

In being raised or lowered, the platform is tilted endwise, as appears in Fig. 5, to clear the cross bar 11 and 11a, 11b, 11c, the platform width affording clearance from the sides of the opening.

To permit manipulation of the platform from the exterior of the trailer body, an arched (or other) handle 12 is attached to the top face of the platform adjacent its rear edge, and a cord 13 is secured at one end to the forward portion of the platform, its other end being free and carrying a handle 14. The length of said cord is such that a person reaching into the trailer through the doorway thereof may readily grip the handles 12 and 14 to raise or lower the platform.

It is desirable when said platform is lowered to prevent wind, rain, and dust from entering the trailer body through the bottom opening, and this may be accomplished by a wall-forming member 15 of canvas or other suitable sheet material marginally secured to the platform at its lower edge, and having its upper edge detachably connected to the margins of said opening. As shown, turn buttons 16 upon the trailer body are engageable by eyelets 17 in said tubular member to establish such connection. That portion of the member 15 which is adapted to lie substantially beneath the trailer doorway preferably forms a flap adapted to be swung rearwardly in unison with the door so as to afford an unobstructed passage into the trailer from the ground to the doorway top, when the cross bar section 11b is also swung back as in Fig. 8. This result is preferably achieved by adapting the upper and lower edges of said flap portion to detachably engage studs 17a and 17b respectively secured to the lower edge portion of the door and to the underlying front portion of the platform.

In the forward end portion of the trailer body, it is preferred to install upper and lower berths 18, their lengths occupying the full distance between the trailer side walls.

Between the lowermost of said berths and said bottom opening, a member 19 is rigidly extended between the wheel housings 9 close above the axle, functioning as a portion of the trailer floor and as a bench, according as the platform is raised or lowered.

When the described trailer is in camp, any suitable support 20 may be disposed beneath the tongue 21 of the trailer to hold the vehicle level.

Rearwardly of the housings 9 a narrow floor area intervenes between the side walls 2 and bottom opening of the trailer and this may support built-in cabinets 22 or other conveniences.

By providing that portion of the described member which is to be utilized as standing room with a bottom member which may be easily lowered to increase the head room, the necessary height of the trailer and its wind resistance are greatly reduced, with a resulting increase of stability and more pleasing appearance.

The berths, elongated between the trailer side walls, occupy a minimum space, and necessity for any adjustment thereof is avoided.

By transferring the weight of persons occupying the living space of the trailer when in camp to the ground rather than to the vehicle frame, a firmer footing is assured, and necessity of a rear support beneath the trailer body is avoided.

The extreme simplicity and consequent low cost of the described provision for increasing head room within the trailer, when in camp, are conductive to a low cost of production, and minimize the time and effort requisite to convert the vehicle from its road form to its camp form, and vice versa.

While the enclosure which excludes the weather from the bottom opening when the platform is lowered has been illustrated and described as extended between the margin of said opening and that of the platform, it is evident that said enclosure might be arranged to extend to the ground from the vehicle in any manner so as to surround said opening.

While it is apparent that the illustrated embodiment of my invention is well calculated to adequately fulfill the objects and advantages primarily stated, it is to be understood that the invention is susceptible to variation, modification and change within the spirit and scope of the subjoined claims.

What I claim is:

1. A vehicle comprising wheels and a body elevated by said wheels and having a top, side and end walls and a bottom opening, a platform normally positioned adjacent to the bottom of said body and closing said opening, and downwardly movable to an alternative position of use, and flexible sheet material extending from the margin of said platform to that of said opening in the lowered position of said platform.

2. A vehicle comprising wheels and a body elevated by said wheels, and having a top, side and end walls, and a bottom opening, supports upon said body at opposite margins of said opening, a platform normally resting upon said supports, and removable therefrom to an alternative position of use, beneath said opening, and means carried by said body for forming an enclosure around said opening and said platform, when the latter is lowered.

3. A trailer comprising wheels and a body elevated by said wheels, and having a top, side and end walls, a berth extending from side to side of said body adjacent to one end wall thereof said body having a bottom opening between said berth and its other end wall, supports on said body at opposite margins of said opening, and a platform normally engaging said supports and disengageable therefrom to rest upon the wheel-supporting surface below said opening.

4. A vehicle comprising a wheeled axle, and a body elevated by said axle and having a top, side and end walls, and a bottom opening between said axle and one of its end walls, a berth carried by said body adjacent to the other end walls, supports carried by said body at opposite margins of said opening, a platform normally resting upon said supports and removable from said supports to a position below said opening, and a member carried by said body between said opening and berth, forming with said platform a floor to said body in the normal position of the platform, and forming a seat in the lowered position of the platform.

5. The combination with a vehicle body having a doorway and a bottom opening adjacent to said doorway, of supports carried by said body at its margin adjacent to said doorway and at the opposite margin, a platform normally engaging said supports, and removable therefrom to a position below said opening, flexible sheet material forming walls connecting corresponding margins of said opening and platform, when the latter is lowered, a handle member attached to said platform adjacent to said doorway, and a flexible companion handle member secured to said platform remote from said doorway and elongated for manipulation through said doorway, said handle members adapting said platform to be raised and lowered and tilted for vertical actuation past said supports.

6. A vehicle comprising wheels, a body elevated by said wheels, having a bottom opening, a closure for said opening, movable to uncover the same, and means carried by the vehicle, adapted to be extended therefrom to the wheel-supporting surface, to form an enclosure around said opening, when uncovered, to exclude the weather.

7. A vehicle comprising wheels, a body elevated by said wheels, having a bottom opening, a closure for said opening movable to uncover the same, and a flexible fabric member extensible from said body to the wheel-supporting surface in a surrounding relation to the uncovered opening.

8. A vehicle body having a doorway in one of its walls and having a bottom opening and having a sill member extended beneath said doorway normally separating said doorway and bottom opening, said sill member having a portion thereof movable to establish unobstructed communication between said doorway and bottom opening and a platform normally closing said bottom opening and movable independently of said sill member to uncover said opening.

9. A vehicle comprising wheels and an enclosed body elevated by said wheels having a doorway and a bottom opening adjacent to said doorway, a closure for said bottom opening movable to uncover said opening, and a brace member normally extending beneath said doorway and removable from that position to afford an unobstructed passage into said opening below the doorway.

10. A vehicle comprising wheels and an enclosed body elevated by said wheels having a doorway and a bottom opening adjacent to said doorway, a door normally closing said doorway and hinged to swing outwardly from said body, a platform normally closing said bottom opening and lowerable to engage the wheel-supporting surface, and means for connecting the platform, when lowered, to said body and to the lower edge of the door, the door-engaging portion of such means being free to swing with said door to afford an unobstructed passage into said opening below the doorway.

11. A trailer comprising a wheeled axle, and a body elevated by said axle and projecting forwardly and rearwardly thereof, said body forming an enclosure having a doorway in its rear end and having a bottom opening extending between said axle and doorway, supports upon said body at opposite margins of said opening, and a platform freely resting upon said supports, whereby access is had to said platform through said doorway to lift said platform from said supports and to tilt it for downward passage through said opening.

12. A vehicle comprising wheels and a body elevated by said wheels and forming an enclosure having a bottom opening, supports carried by said body at opposite margins of said opening, a platform normally engaging said supports and freely removable therefrom for downward displacement through said opening, a plurality of fasteners carried by said body marginally of said opening, and a fabric wall, forming an enclosure between the margins of said platform and said opening, in the lowered position of the platform, detachably engageable with said fasteners.

13. A trailer comprising a wheeled axle, a frame supported by said axle, draft means arranged at the front end thereof, said frame forming an enclosure having a doorway in the rear end thereof, and having a floor extending from the axle to the forward end of said enclosure, said floor having an opening of greater lateral width than that of said doorway, and said opening extending from said axle rearwardly substantially to said doorway, whereby said opening and doorway do not weaken resistance of said body to draft strains transmitted from its front end to said axle, a vertically movable platform normally closing said opening, and said frame comprising a hinged member disposed beneath said doorway and movable to afford an unobstructed passage into said opening below the doorway.

In testimony whereof I sign this specification.

ARTHUR G. S. SHERMAN.